United States Patent [19]
Cullen

[11] Patent Number: 5,920,565
[45] Date of Patent: Jul. 6, 1999

[54] METHOD AND APPARATUS FOR INTRANETWORK COMMUNICATION

[75] Inventor: John Michael Cullen, Suffolk, United Kingdom

[73] Assignee: British Telecommunications public limited company, London, United Kingdom

[21] Appl. No.: 08/586,720

[22] PCT Filed: Aug. 1, 1994

[86] PCT No.: PCT/GB94/01685

§ 371 Date: Mar. 29, 1996

§ 102(e) Date: Mar. 29, 1996

[87] PCT Pub. No.: WO95/04418

PCT Pub. Date: Feb. 9, 1995

[30] Foreign Application Priority Data

Jul. 30, 1993 [EP] European Pat. Off. .............. 93306050

[51] Int. Cl.⁶ .................................................. H04L 12/00
[52] U.S. Cl. .......................................... 370/401; 370/466
[58] Field of Search ..................................... 370/400, 401, 370/402, 409, 410, 466, 467, 911; 395/200.79

[56] References Cited

U.S. PATENT DOCUMENTS

| 5,008,879 | 4/1991 | Fischer et al. ........................... 370/401 |
| 5,208,811 | 5/1993 | Kashio et al. ........................... 370/401 |
| 5,420,916 | 5/1995 | Sekiguchi ................................. 370/467 |
| 5,530,842 | 6/1996 | Abraham et al. ................... 395/200.51 |
| 5,655,001 | 8/1997 | Cline et al. .............................. 370/328 |

*Primary Examiner*—Min Jung
*Attorney, Agent, or Firm*—Nixon & Vanderhye, P.C.

[57] ABSTRACT

A method and apparatus for controlling a communication system having functional elements that perform monitoring or control functions using data flow to and from control function elements is disclosed. The functional elements do not necessarily employ the same communication protocol as the elements with which they communicate. Accordingly, the intranetwork communications of the communication system are processed to provide appropriate conversion of intranetwork messages via an interface element.

48 Claims, 13 Drawing Sheets

Fig. 15
MACRODIVERSITY BEFORE
EXAMPLE 1 AFTER
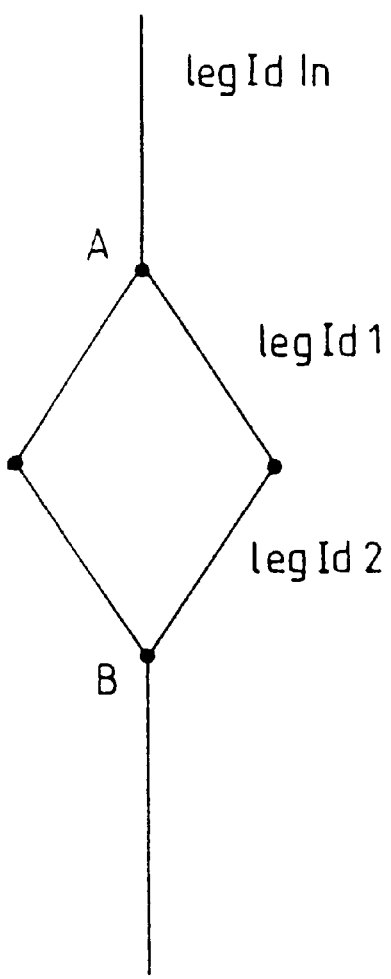
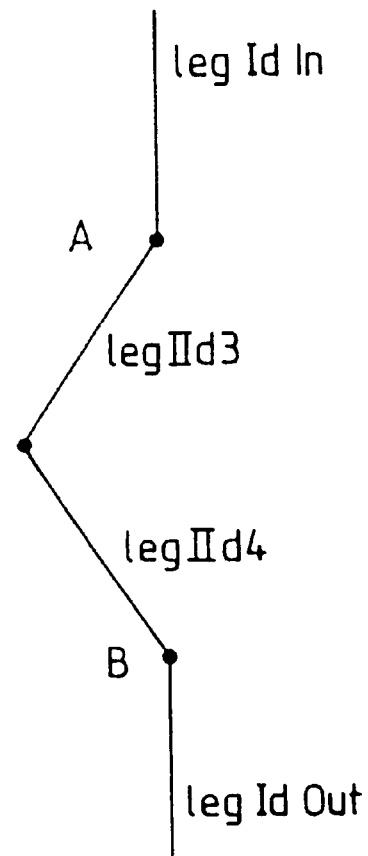

METHOD AND APPARATUS FOR INTRANETWORK COMMUNICATION

BACKGROUND

1. Field of the Invention

This invention relates to the operation, monitoring and control of a communications system. It is of particular relevance to the operation of telecommunications networks, but is not limited to such systems.

2. Related Art

In this specification the term 'functional element' is used to define an element of a communications system which performs some function, e.g. a switching or monitoring function, to the system itself, as distinct from an 'application process element' which controls a number of "Functional elements" to achieve a high level function, usually requiring concerted action from several functional elements. This high-level function may be a network application such as a handover process in a mobile radio system.

In a telecommunications network the functional elements of the system are widely distributed. For example, switching functionality is required at nodes throughout the system. However, in conventional telecommunications networks application process control is concentrated, requiring a large signalling load to be carried over the telecommunications network. Despite the distributed nature of the system all elements of the network which interact must have compatible signalling formats. This is a particular problem in a cellular radio network, where mobile units made by a number of different manufacturers can turn up anywhere in the system and have to interact consistently with whichever fixed part of the network they happen to have established communication with. In such a network it is difficult to arrange for enhancement or improvements, because of the need for all signalling formats to remain compatible. Further problems arise in known systems because of the need for measurements of network conditions e.g. link performance to be made, and the results transmitted to a control centre, either continuously or discontinuously depending on the nature of the measurements to be made and the purpose for which they are required. This places an additional signalling overhead on the network. Many measurements are often only required in specific operating circumstances. It is therefore wasteful of signalling capacity for all possible data to be transmitted when much of it is redundant. The limited signalling capacity and the number of different measurements to be made also reduce the resolution of the measurement and/or the sampling rate that can be supported.

A further limitation on capacity in conventional systems is caused by limited routing capabilities. Particularly in a case where a call requiring very high bandwidth or data rate is required, there may be no single route available through the network allowing such capacity. This may be the case even if it is possible to re-route calls in progress without interruption in order to provide greater capacity on a particular link. In these circumstances, a call requiring a higher bandwidth would either fail or cause another lower priority call already in progress to fail, although the system as a whole does have sufficient capacity. Existing telecommunication systems normally permit single links from point to point only. If the link is unreliable, error checking processes may be employed but these require additional data in order to perform the error checking. It is known for mobile units to monitor more than one base station simultaneously, in order to identify the one with the best quality signal. However, in a conventional switched network, because the switching and control of the call are indivisible, the call is handled over a single route only.

Another example of concentration of control is the provision of "conference" facilities in a telecommunications network. In conference bridging, the bridging is set up under the control of a user who sets up a request for bridging to allow more than two users to communicate together simultaneously. This requires an existing link to be bridged to a new one to allow the third caller to communicate with the other two.

In prior art systems, such as that shown in FIG. 10, bridging is only possible in major switching centres 40 and these bridges are of fixed capacity. FIG. 10 shows three terminal units 38a, 38b, 38c arranged to form a 'conference call' with each other. Units 38a, 38b are both connected to node 37 but this has no bridging capability. Node 37 and unit 38c are both connected to major switch 40 which has a bridging capability. This means that although units 38a, 38b are both in communication with user 38c through the same node 37 and require a bridge to be made between them, each unit 38a, 38b must be provided with its own bearer 39a, 39b all the way to the mobile switching centre 40. If the bridging could take place at the base station 37, one of the bearers 39a, 39b would be released for other purposes. Referring to FIG. 11, at a switching centre 32 where a bridge is to take place, control processes ensure that each message a,b,c coming into the switching centre 32 is passed from one caller A, B or C on to all other callers.

SUMMARY OF THE INVENTION

According to a first aspect of the invention there is provided a method of operating or controlling a communications system having functional elements and application process elements each controlling a plurality of the functional elements, the method comprising the transmission of commands by the application process elements to an interface element the commands transmitted by the application process elements being independent of the type or configuration of the functional elements, and the conversion of said commands to commands suitable for controlling the functional elements.

According to a second aspect of the invention there is provided a communications system comprising a plurality of functional elements and one or more application process elements for controlling or controlled by the functional elements, characterised in that there is provided an intermediate processor element to interface between one application process element and a plurality of functional elements, the application process element or elements being configured to generate commands in a form which is not specific to the configuration or types of functional elements, and the intermediate processor element being configured to execute the commands generated by the application process element by transmitting commands to the functional elements.

According to a third aspect of the invention there is provided an intermediate processing unit for a communications system for controlling a number of functional elements of the system under the control of or controlled by one or more application process elements of the system comprising an external interface module for receiving commands from an application process element in a form not specific to the configuration or type of the functional elements, an instruct and receive module for executing the commands so received and transmitting them to the functional elements required to execute the command, and a processor module for processing data passing between the functional elements and the application process element.

This invention allows the "intelligence" in the network to be physically separate from the functionality. This in turn allows the functionality, in particular for switching purposes, to be available at many more locations in the network than the main application elements.

In a preferred method according to the first aspect of the invention the monitoring and control processes required are operated by functional units located at suitable points throughout the system. The points at which these units are located depend on the particular function they are required to perform. For instance, in a cellular radio network, the measurement of signal quality takes place at the individual base stations, but handovers and multi-casting require routing at switching points. Each of these functional units is configured to suit the circumstances of the individual location of the unit. For instance a bridging element is configured according to the number of possible links available at the switching centre concerned.

Dedicated signalling links between the intermediate processing units and the functional elements distributed around the network may be provided. Where the system being controlled is a telecommunications network, the signalling may be carried over the traffic bearer links of the network. The intermediate processing elements need not be located at a node of the bearer network. Using the telecommunications network example, they can be located at any point in the network, and for different functions may be located at different points.

BRIEF DESCRIPTION OF THE DRAWINGS

Embodiments of the invention will now be described, by way of example and with reference to the accompanying drawings, wherein:

FIGS. 15, 16, 17, illustrate three possible changeovers in a diversity control system which may be controlled by the embodiment of FIGS. 6 and 7.

DETAILED DESCRIPTION OF EXEMPLARY EMBODIMENTS

Figure 1:
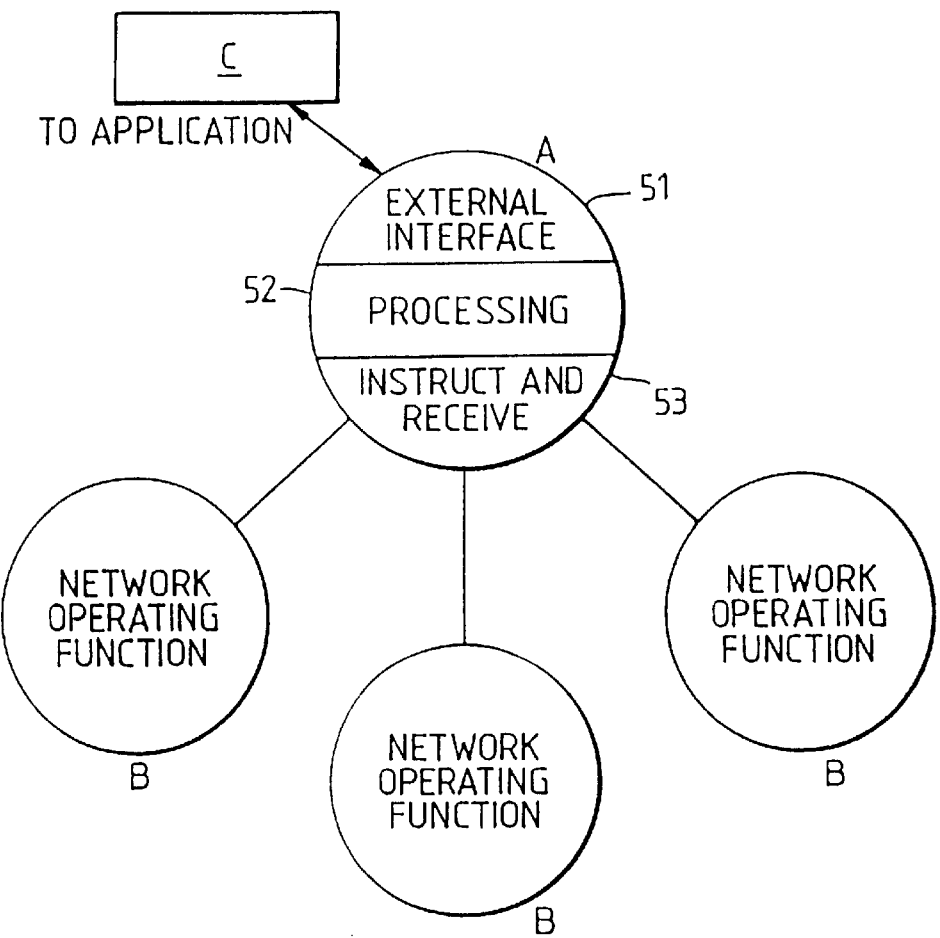
FIG. 1 is a functional representation of a system according to a first embodiment of the invention.

Referring to the drawings, in the first embodiment of the invention, a communications system, shown in FIG. 1 in functional terms, comprises a telecommunications network incorporating an intermediate processor function A interconnecting functional elements in the form of network operating functions (NOFs) B, with an application process element C. The intermediate processor function A has three functional modules: an external interface module 51, processing module 52, and instruct and receive module 53.

In operation, intermediate processor function A relays data between NOFs B and application C in both directions. The application C may be a network service or service element and the data may be, for example, control messages going from application C to NOFs B, or measurement or status data going from NOFs B to application C.

Intermediate processor function A performs three functions. Instruct and receive module 53 sends instructions and data to, and receives data from, the individual network operating function elements. External interface module 51 interfaces with the application C. These two modules 51, 53 are linked by the processing module 52 which, for example, translates (a) instructions from the application C into the individual instructions for NOF B, and/or (b) data received from the NOF B into a data format suitable for the application platform C.

Although FIG. 1 has been illustrated for a single application C for simplicity, there may be a plurality of applications interconnected with respective or common NOFs by respective or common processing units, as will be seen from the following description of various other embodiments of the invention.

In intermediate processing unit A, the external interface module 51 provides a common interface to application platform C. This interface offers the application platform C a set of available commands that processing module 52 can perform independent of the interface to the network operating functions B.

The processing module 52 performs the conversion of application information data into information specific to the individual NOFs, and/or performs the conversion of NOF information into a form suitable for the application platform C.

The instruct and receive (IR) module 53 communicates with the NOFs B, and may have different interfaces to different NOF units in the network. The IR module 53 converts between primitives used by the processing module 52 and information message formats used by NOFs B.

Instead of, or in addition to, the conversion or translation described, the processing module 52 may also perform additional processing specified by application platform C. The NOFs B may take the form of functionality associated with the network, e.g. embedded software, or they may be discrete elements, units or modules e.g. monitoring elements or network control functions.

Similarly, the applications platform C may be a function or functionality embedded in the network, e.g. in a service control point or it may be embodied in a stand-alone application platform.

Figure 2:
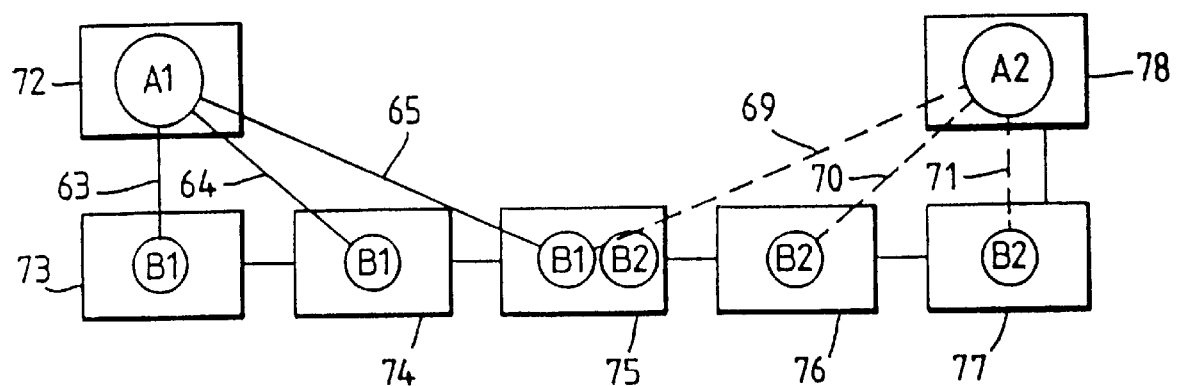
FIG. 2 is a schematic diagram of a network architecture incorporating the functionality of the system of FIG. 1.

FIG. 2 illustrates how the generalised system of FIG. 1 may be mapped to a Network Architecture. In functional terms elements A1, A2 represent application process control functionality and B1, B2 represent network operating functions. Functionality scripted "1" e.g. A1, B1 represents an intelligent network element where Service Control is separated from the switching network and signalling is carried over separate links (63, 64, 65). Functionality scripted with a "2" (e.g. A2, B2) represents elements where all functionality is incorporated in the switching network which carries the signalling information to provide logical links (69, 70, 71). As can be seen from FIG. 2 both the process control functionality and the network operating functionality can be located at potentially any node in the network. These nodes (72 to 78) may be for example service control points, network management centres, switches etc. Important aspects to be noted are that:

(i) process control functionality is located in specific nodes (72, 78) throughout the network.

(ii) secondly, process control functionality for a particular application is fixed in a particular network node, e.g. process control A1 in node 72, but for different applications or uses of the same (particularly if the base station are at different sites), application can be located in different network nodes (e.g. process control A2 in node 78).

(iii) the network operating functions B1, B2 are located at switching network nodes 73 to 77 and are activated by the process control functionality where needed in a real-time dynamic manner. These functions are closely associated with the bearer network.

(iv) a specific use of process control functionality A1 in a particular network node can be to control a network operating function B1 at a network node 75 where there is also present another or the same network operating function B2 under the control of another process control functionality A2.

Figure 3:
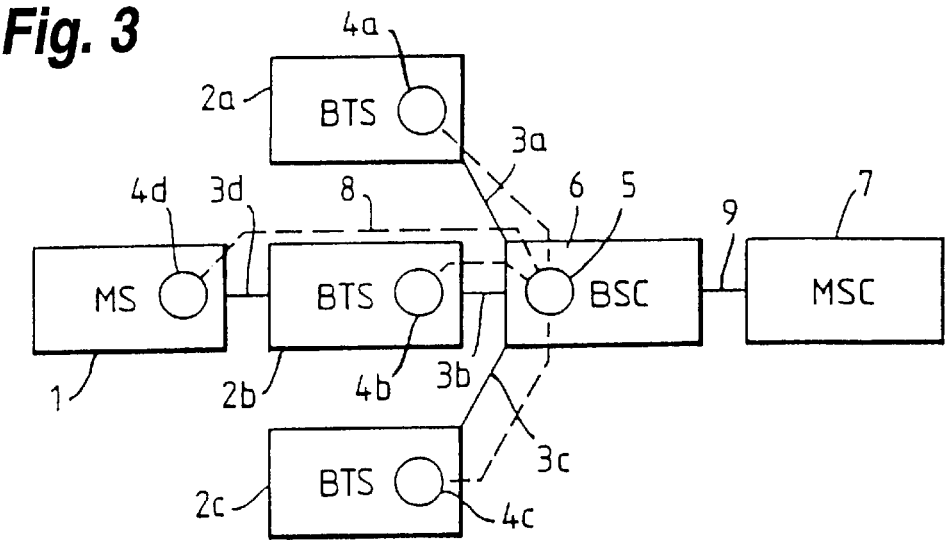
FIG. 3 shows schematically a mobile radio network in accordance with a second embodiment of the invention.
Figure 4:
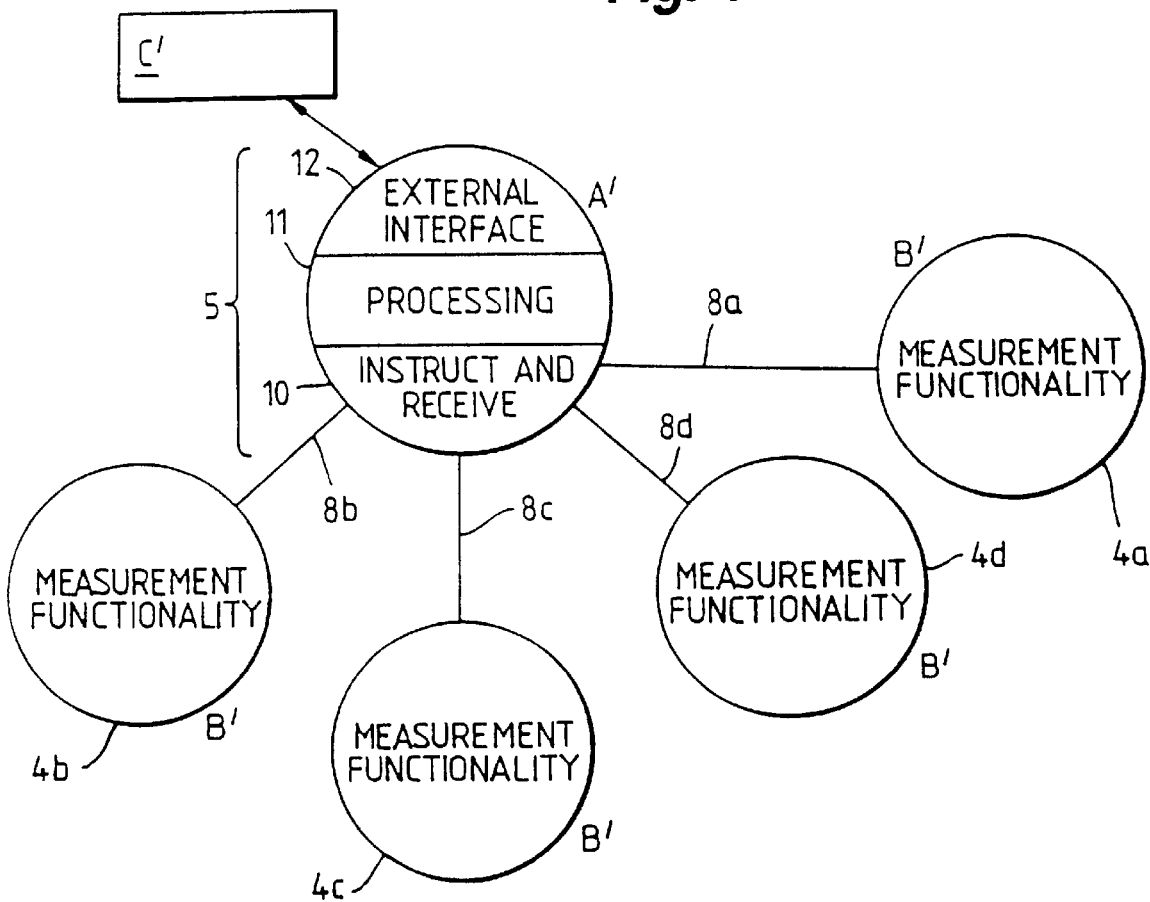
FIG. 4 shows the network of FIG. 3 in functional terms.

A second embodiment of the invention, shown in FIGS. 3 and 4, is a communications system having means for collecting and processing data on the quality of bearer links in the system. In this second embodiment the system is a mobile radio telecommunications network. The collected data in this particular example is to be used in the handover process of the mobile radio network.

FIG. 3 shows a simplified diagram of the mobile radio network, illustratively a cellular radio network, comprising a mobile unit 1 and three base stations 2a, 2b, 2c each having measuring equipment 4a, 4b, 4c, 4d for monitoring the quality of respective bearer links, 3a, 3b, 3c, 3d. In the case of base station 2b the bearer links 3b, 3d are actual links with the mobile unit 1 currently in operation and carrying traffic. The other two base stations 2a, 2c are potential candidate base stations for taking handover of the mobile unit 1 from base station 2b and respective links 3a, 3c are not currently carrying traffic to mobile unit 1.

The base stations 2a–2c are all connected to other parts of the network through a base site controller 6 and mobile switching centre 7.

The individual base stations 2a, 2b, 2c may be co-located, for instance to cover different sectors of a cell, and the base site controller 6 may also be co-located with them. The measuring equipment 4a, 4b, 4c, 4d in the various base stations 2a, 2b, 2c and the mobile unit 1 need not be the same, (particularly if the base stations are at different sites) so the raw data received from each device may be different in form. In particular, modern mobile networks must be capable of supporting mobile units built by a variety of manufacturers. Although the methods of measurement may differ, the properties to be measured, such as bit error rate (BER), C/I, received power level, or bit rate are similar for each unit.

The process control unit 5 is located in the base site controller 6, and is in communication with each of the measurement units 4a–4d. The necessary signalling is carried over the bearer links 3a, 3b, 3c, 3d, which also carry the telecommunications traffic for which the links have been set up. The process control unit 5 instructs the measurement units 4a, 4b, 4c, 4d to take measurements of link performance e.g. BER, C/I, received power level or bit rate. These units may collect data continuously, or may only do so in response to a signal from the process controller, 5.

It will be noted that data collected by unit 4d at the mobile station 1 will travel by way of one of the base stations 2b. However, the base station 2b does not process this data in any way but passes it on to process control unit 5 located in the base site controller 6. There is thus a direct logical link 8d between measurement unit 4d and process control unit 5, as well as logical links 8a, 8b, 8c between measurement units 4a, 4b, 4c and process control unit 5. The base station 2b itself also sends data collected at the base station 2b by measurement unit 4b. The process control unit 5 is connected to an application function $C^1$ e.g. a handover control function in mobile switching centre 7 or base site controller 6 to provide the application function with data.

The measurement units 4a, 4b, 4c, 4d can be configured to make different measurements according to instructions received from the processing unit 5. Such changes may be made dynamically e.g. depending on prevailing conditions, for example the type of signal e.g. voice or data being carried by the bearer, or in response to prevailing conditions elsewhere in the network, e.g. time of day/day of week.

The parameter to be measured (e.g. bit error ratio, C/I, RSSI) can be selected dependant on the type of signal which is to be carried by the bearer (e.g. analogue/digital, different bit rates, etc.).

As the measurement process control unit 5 is located in the base site controller 6, measurement collection control is performed at as low a level in the network as possible, whilst minimising the processing power in the base stations 2a–2c themselves. By locating the process control unit 5 at a localised level, the data can be compressed and selected at this level, thereby reducing the amount of signalling from and to other parts of the network.

Furthermore where, for example, the base site controller 6 includes sufficient processing to identify which of the three base stations 2a–2c has the strongest signal from the mobile unit 1, only that fact need be passed to the decision making unit (typically located in the mobile switching centre 7) determining whether a handover is to take place. Indeed, where handover is between base stations handled by the same base site controller the mobile switching centre 7 may not need to be involved at all.

The monitoring equipment 4a–4d performs the collection of bearer link quality information in the network. This equipment need only have limited functionality. Its function need only be to monitor a particular physical link and report measurements to the measurement process control unit 5.

The operation of the system of FIG. 3 will now be further described with reference to FIG. 4 which illustrates the system in functional terms. In particular measurement functionality $B^1$ corresponds to measuring equipment 4a–4d, processor function $A^1$ corresponds to process controller 5, and the application function $C^1$ corresponds to e.g. the handover function in BSC 6 and/or MSC 7.

Processor $A^1$ has three modules, as illustrated in FIG. 4: an instruct and receive module 10, a processing module 11, and an external interface module 12. Instruct and receive module 10 is in direct communication with the measurement functionality $B^1$. This module receives measurement data from the measurement functionality $B^1$, and is configured to recognise data streams as they come in and convert them into a standard format. Conversely, it also receives signals from the processing module 11 and converts them into instruction signals recognisable by the individual measuring functionalities $B^1$. The instruct and receive module 10 has a functional element which is dedicated to a respective measurement functionality to which it is connected, and which is configured to be compatible with it. The functional elements of the instruct and receive module 10 required for each measurement functionality $B^1$ may be co-located, e.g. in software. Different functional elements may be embodied in common hardware, for instance if each measurement unit 4a–4d is polled in turn by process controller 5 using time division, the instruct and receive functionality embodied in the process controller 5 has to translate in turn between the standard processing of the processing module 11 and the format required by the measuring function $B^1$. This requires the instruct and receive module 10 to be configured in each time slot for the message format used by the individual measurement functionality $B^1$. The term "element" must thus be understood to embrace any function or combination of functions by which the instruct and receive module can be implemented, and correspondingly the physical realisation of the elements, modules and units can be by any means, with parts shared or not.

The processing module 11 handles control signals from the external interface module 12 (to be discussed below), and also processes measurement parameters received in a standardised format from the instruct and receive module 10. The processing module 11 controls, through instruct and receive module 10, the measurement function $B^1$, and also performs any control actions required. In response to a request for data from the application $C^1$ received via external interface module 12, the processing module 11 sends an instruction to the instruct and receive module 10 to collect data from the individual measurement function $B^1$. These instructions are translated by the instruct and receive module 10 into the format required by the measurement functions $B^1$. The measurements having been received back at the instruct and receive module 10, and translated back into the common processing format by that module, the processing module 11 performs formatting and/or other processes such as for example an average over a given time period or a mathematical function of one or more of the parameters received from the measurement functions $B^1$. As a particular example, the processor $A^1$ may compare the signal strengths measured by the measurement functionality $B^1$ associated with (three) candidate base stations (4a–4c) from which data was requested, and return a signal to the handover application $C^1$, via the external interface 12, giving the identity of the base station 4b having the strongest signal. In this example, the absolute values of the signals are not sent via the external interface module 12 to the application $C^1$.

The external interface 12 sends data signals to and from the application $C^1$. In the case of handover determination this application $C^1$ is the network control function responsible for handover. The function itself sends signals via the external interface module 12, in a standard form, to instruct the processing module 11 to send start, or stop signals, or a request for data to measurement functions $B^1$. The network control function $C^1$ also receives data from the measurement functions $B^1$ by way of the process unit $A^1$.

The measurements may be made for a continuous period, or a single instantaneous measurement may be required. The instructions to be sent from the application $C^1$ to the process control function $A^1$ will obviously differ in these two cases. Similarly, if the result required is, for example, a time average, then the process control module 11 provides processing and storage and the time averaged result is transmitted to the measurement control application $C^1$ periodically. In these circumstances the process control module 11 includes, functionally, a data buffer to store the data while these time averages, trends, etc. are being calculated.

The network may include many different designs of switches and mobile units, each with its own measurement functions and physical realisation. The measurement control function $A^1$ provides a way of intelligently interfacing these measurement systems with one network management measurement application $C^1$. Pre-processing is performed in the processing function $A^1$, and the results of the processing of the measurement data passed to the handover application $C^1$ so that handover decisions can be made. Where the physical realisation of the processing functionality $A^1$ is located in the base stations 2a–2c the quantity of data carried by the bearer links 3a–3c is reduced.

The measurement control function may be used for other purposes than handover. For example, measurements may be required for fault monitoring, statistical analysis for future traffic planning, billing, etc. The external interface 12 is configured to respond to signals from any such application platforms.

Different measurement functions $B^1$ may be capable of making different measurements. Such differences are handled by the instruct and receive module 10 of the processing unit $A^1$ in order to provide a common data standard for the use of the network application.

In one variation of this embodiment the individual measurement functions $B^1$ have very limited functionality. They operate constantly, monitoring a property of the system. On a request from the process control function $A^1$ the current value of the data is reported back to the process control function $A^1$. The decision as to which data is passed on to the application $C^1$ is taken by the process control $A^1$ acting in response to instructions from the applications $C^1$.

Figure 12:
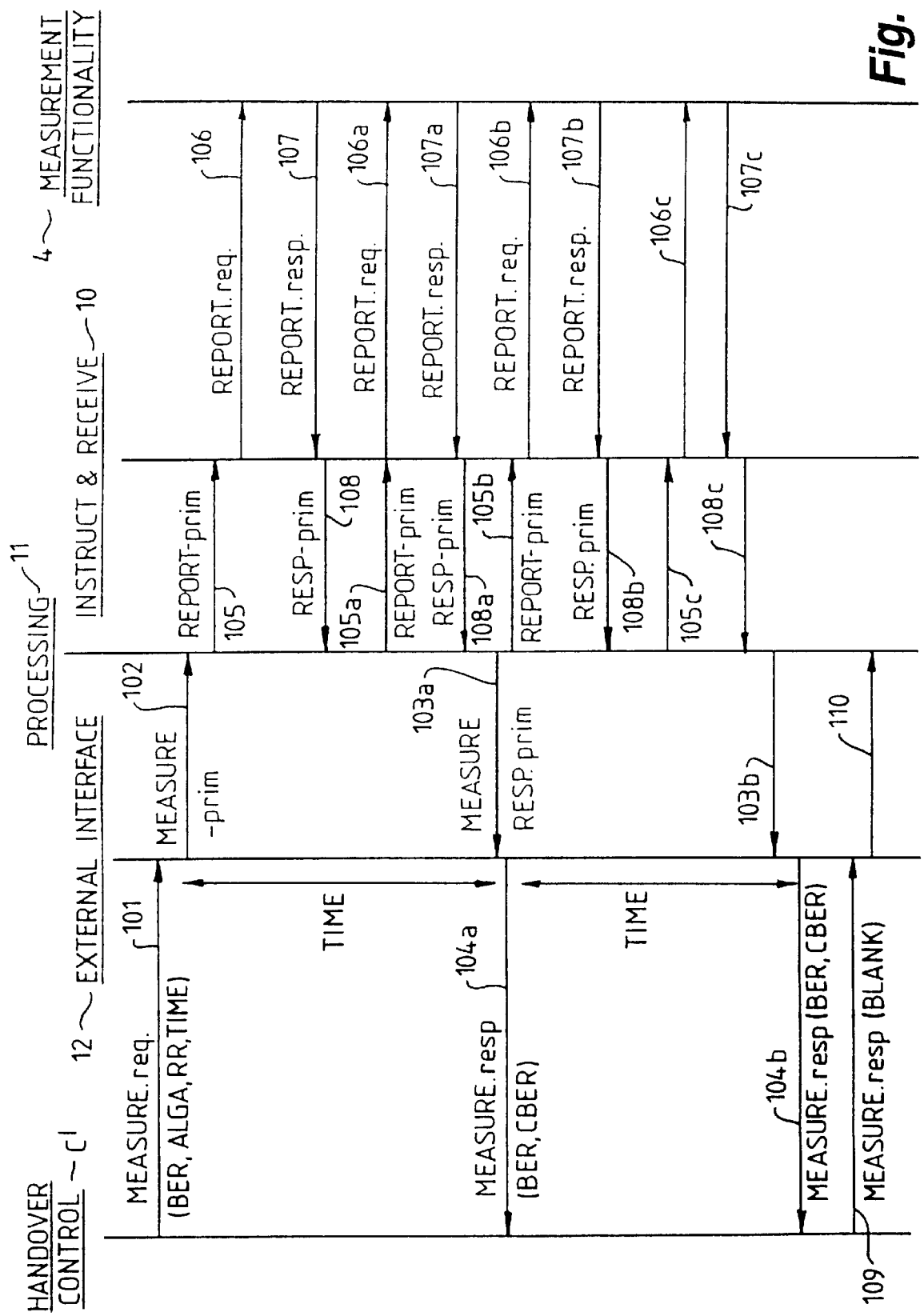
FIGS. 12, 13, 14 are flow charts illustrating the data flows taking place within the embodiment of FIGS. 3 and 4, in relation to a handover control process.
Figure 13:
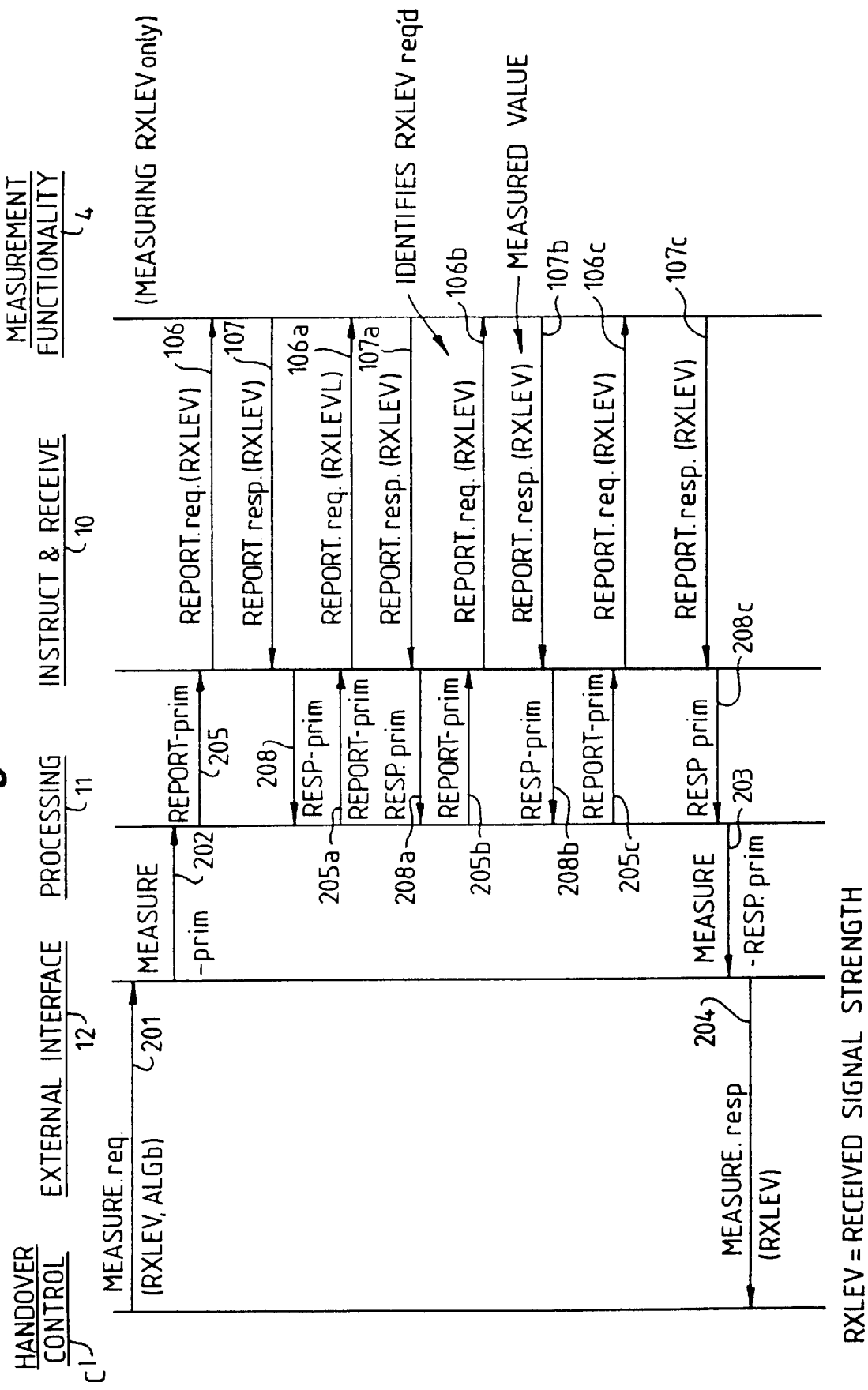
Figure 14:
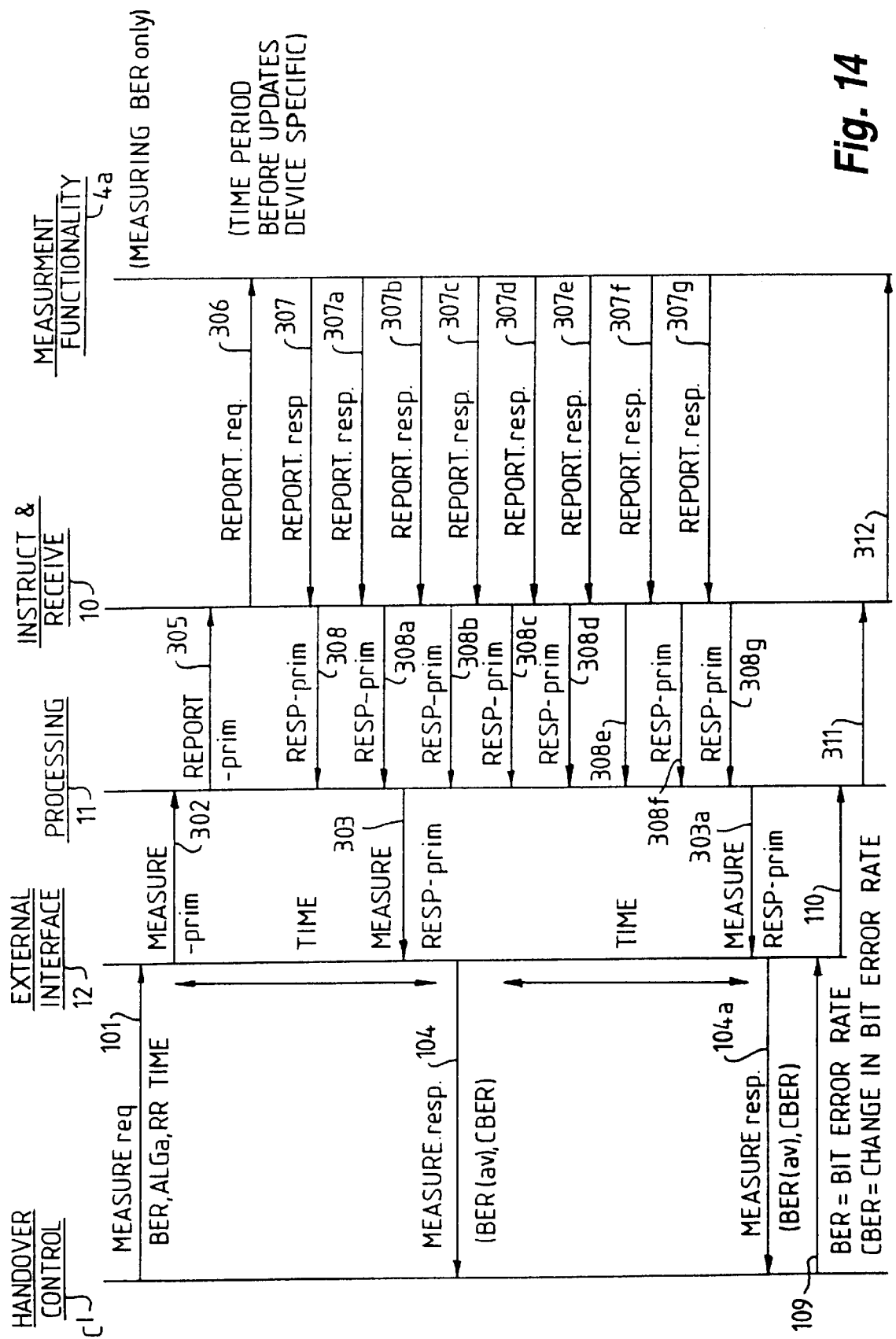

FIGS. 12, 13 and 14 are flow charts illustrating the data flows taking place within the system of FIGS. 3 and 4. In this example the high-level application ($C^1$) is a handover control.

Two message formats are available to the external application $C^1$: "Measure request" and "Measure response"

1) "Measure request".

This message is passed from the handover control $C^1$ to the external interface 12 and has fields specifying:

the parameter(s) to be measured (in this case the bit error ratio BER), the algorithm to be applied to measurements (either ALGA: provide an average value of the parameter and the change in that value; or ALGB: provide averaged-value of the measured parameter when parameter drops below 50% original value), reporting method (RR=regular reports at intervals, or a null value indicating a request to provide a response when the algorithm provides a result), the time between measurement reports if applicable (TIME).

2) "Measure response".

This message passes from the external interface 12 to the handover control $C^1$ and contains result parameters from the measurement algorithm in the processing block in the form specified in the request message. The response message is sent at intervals depending upon the contents of the request message.

FIG. 12 illustrates the operation of the embodiment of FIGS. 3 and 4 for measurement reporting at regular intervals when the remote measurement functionality only sends out measurements when requested. The process controller 5 must therefore respond to a single request from the handover control $C^1$ for periodic data, by sending periodic requests for data to the measurement functionality 4.

The control application $C^1$, in this case the handover control application, sends a measurement request 101 asking for the Bit Error Rate (BER) to be measured. Algorithm A is to be used, in which regular reports are to be sent from the processing module 11 at time intervals of TIME between messages. The processing module is informed about what processes it has to perform by primitives 102 from the external interface module 12. The processing module 11 then operates the required algorithm, starts to gather measurement information and when ready sends the preprocessed information 103*a* back to the external interface 12 which in turn sends information 104*a* to the requesting control application $C^1$. When the processing module 11 requires information from measurement functionality 4 it issues a REPORT primitive 105, 105*a* containing information about what is required to be measured, to the instruct and receive module 10. The instruct and receive module 10, then sends a report request message 106 in a format that will be recognised by the remote measurement functionality 4. In this case the format will be very, simple as the measurement functionality 4 is assumed to be only 'on' or 'off', measuring only BER and then returning it immediately in a Report response message 107. On receipt of this message by the instruct and receive module 10, the module issues a RESP primitive 108 to the processing module 11 carrying the measured parameter in a standard format. The processing module 11 issues further report request primitives 105*a* etc. which are responded to in a similar manner (106*a*, 107*a*, 108*a*). The processing module 11 then performs Algorithm A on the data and after time TIME has elapsed sends a Measureresp primitive 103*a* to the external interface module 12. The external interface module 12 returns the results of the measurement process to the application $C^1$ (Handover Control in this case) in a standard format (in this case BER and the change in BER (CBER)). The processing module 11 continues performing the measurement process 105*b/c*, 106*b/c*, 107*b/c*, 108*b/c*, 103*b* until instructed otherwise by receipt of a primitive 110 relating to a blank Measure request 109 received by the external interface module 12.

FIG. 13 illustrates the operation of the embodiment of FIGS. 3 and 4 for generating a measurement report only when the measured parameter changes by 50%. This would be useful, for example to provide a trigger to initiate a handover process. As in the first example the remote measurement functionality 4 only sends out measurements when requested. This illustrates how the same measurement functionality 4 can be made to supply application process functionality $C^1$ having different requirements.

The handover control application $C^1$ sends message 201 which asks for the Received Signal Level (RXLEV) to be measured, and Algorithm B to be used. Regular reports are not required to be sent from the processing module, as indicated by the absence of the RR parameter.

The processing module 11 is informed about what processes it has to perform by primitives 202 from the external Interface module 12. The processing module 11 then operates the required algorithm, starts to gather measurement information and when ready sends the preprocessed information 203, 204 back to the requesting control application. When the processing module 11 requires information from measurement functionality 3 it issues REPORT primitives, 205, 205*a*, 205*b*, 205*c*, containing information about what is required to be measured, to the instruct and receive module 10. In response, the instruct and receive module 10 then sends Report request messages 106, 106*a*, 106*b*, 106*c* in a format that will be recognised by the remote measurement functionality 4. In this case the format will be again relatively simple in that the measurement functionality 4 is assumed to be only 'on' or 'off', measuring only BER and returning it at a set interval in a Report response message 107, 107*a*, 107*b*, 107*c*. On receipt of these messages by the instruct and receive module 10, the module issues RESP primitives 208, 208*a*, 208*b*, 208*c*, to the processing module carrying the measured parameter in a standard format. The processing module 11 performs the Algorithm B on the data and when the value of the measured parameter has changed by more than 50% the processing module 11 sends a Measureresp primitive 203 to the external interface module 12. The external interface module 12 returns the results of the measurement process to the calling application (Handover Control in this case) in a standard format (in this case RXLEV) 204.

Figure 5:
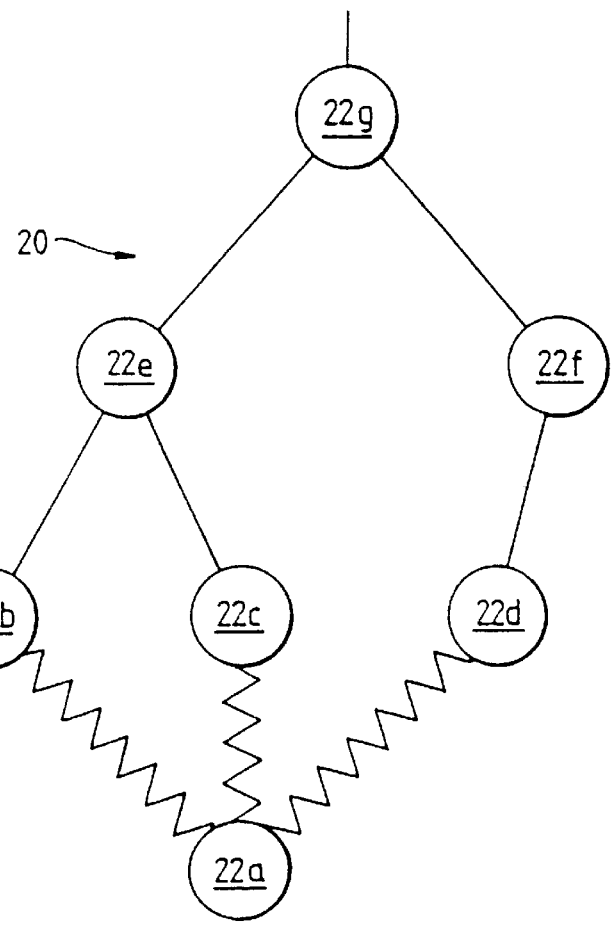
FIG. 5 is a topological diagram of a network according to a third embodiment of the invention.

It will be seen that handover controls $C^1$ having different measurement requirements (FIGS. 5 and 6), can nevertheless interface with the same measurement functionality 4.

FIG. 14 illustrates the operation of the embodiment of FIGS. 3 and 4 for measurement reporting when the remote measurement functionality sends measurements at regular intervals.

Comparison with FIG. 12 will illustrate how different measurement functionalities 4, 4*a* can be used to supply the same application process functionality.

As in the embodiment of FIG. 12, the handover control application, $C^1$, sends a request 101 asking for the Bit Error Rate (BER) to be measured, using Algorithm A, with regular reports to be sent from the processing module at time intervals of TIME between messages. The processing module 11 is informed about what processes it has to performs by primitives 102 from the external interface module 12. The processing module 11 then operates the required algorithm A, starts to gather measurement information and when ready sends the preprocessed information back to the requesting control application 103*a*, 104*a*, 103*b*, 104*b*. When the processing module 11 requires information from the measurement functionality 4*a* it issues a report primitive 305, containing information about what is required to be measured, to the instruct and receive module 10. The instruct and receive module 10 then sends a Report request message 306 in a format that will be recognised by the remote measurement functionality 4*a*. In this case the format will be again relatively simple in that the measurement functionality is assumed to be only 'on' or 'off', measuring only BER and returning it at a set interval in a Report response message 307, 307*a* to 307*g* (this is the difference between this example and that in FIG. 12 and serves to illustrate that different measurement functionality 4, 4*a* can be used to perform a task using the same measurement request 101 from handover control $C^1$ and returning the data in the same format 104*a*, 104*b*). On receipt of the messages 307 by the instruct and receive module 4*a*, the module issues a RESP primitive 308 to the processing module 11 carrying the measured parameter in a standard format. The processing module performs the Algorithm A on the data and after time TIME has elapsed sends a Measureresp primitive 103*a*, 103*b* to the external interface module 12. The external interface module 12 returns the results of the measurement process to the Handover Control $C^1$ in a standard format (in this case BER and the change in BER (CBER 104*a*, 104*b*)). The processing module 11 continues performing the measurement process until instructed otherwise by receipt of a primitive 110 relating to a blank Measure request 109 received by the external interface module $C^1$ as for the arrangement of FIG. 12. The processing module 11 will then issue a Close primitive 311 that will be used by the instruct and receive module to generate a measurement functionality specific close message 312 instructing the module to terminate the module's measurement collection process.

A third embodiment of this invention is a communications system having a multicasting and/or combining function. As shown topologically in FIG. 5, nodes 22*a*–22*g* are distributed throughout a network 20. An incoming signal to a network node e.g. 22*e* can be forwarded to more than one further node 22*b*, 22*c* (i.e. multicasting) or conversely two incoming signals having arrived at the same point 22*e* by different routes (from 22*b*, 22*c*) can be combined together for onward transmission. In a mobile radio system the air interface may form one or more of the bearer links so that a mobile unit, (e.g. 22*a*) can be linked with more than one base station (22*b*, 22*c*, 22*d*) simultaneously. The combining and splitting functions need not take place at the air interface, e.g. nodes 22*e*, 22*g*.

By arranging for signals to travel by more than one route problems which may be caused by faults in the network can be overcome. For example, if a signal is received over a single link e.g. that between nodes 22*b* and 22*e*, which may be unreliable, there is no way of telling whether the data is correct or not, nor is there any way of correcting it even if it is known to be incorrect, other than by using error correction protocols requiring extra bits in the bit stream. By also receiving signals from a second link between nodes 22*c* and 22*e*, the signals can be compared, and if they are identical there will thus be greater certainty that the data stream has not been corrupted. If they are different then error correction processing can request a repeat of that part of the bit stream.

Weighting factors can be introduced if it is known that one link is more reliable than another. Other possibilities occur with a greater number of paths. For example, with three paths should a binary digit in one of the bit streams differ from the corresponding digit in each of the other two then it can be assumed that the two identical streams are correct and the third one is wrong.

The functionality described below allows both diversity over the air interface, where a mobile unit (e.g. 22*a*) may be in contact with more than one base station (22*b*, 22*c*, 22*d*) simultaneously, and also diversity across the network, allowing routing over a plurality of (parallel) bearer paths. Another advantage of such diversity is that should there be insufficient capacity for the required signal to be sent over any single bearer, it is possible to use several paths each of lower capacity and each handling part of the data stream.

At each node there is a multicasting and/or combining unit. These are controlled by a process unit described below. This allows greater diversity within the system as multicasting is available throughout the network instead of only at predetermined control points as is possible with existing arrangements.

Figure 7:
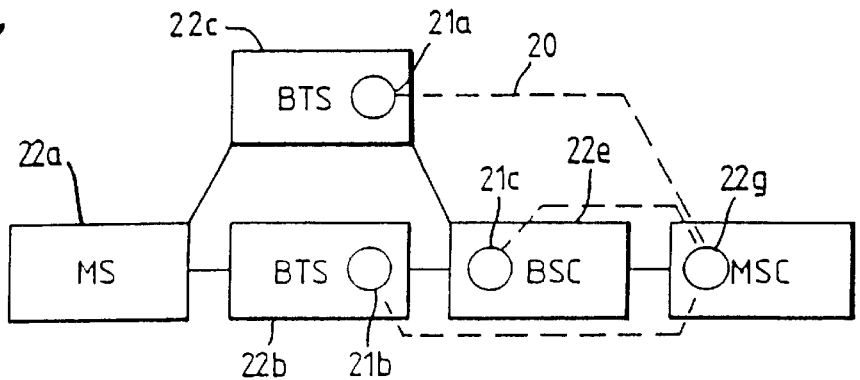
FIG. 7 shows schematically a mobile radio network embodying the topology of FIG. 5 and the functional aspects of FIG. 6.

FIG. 7 shows a physical realisation of this embodiment in a mobile radio network. The multicasting/combining function is carried out using units of three types. Within each base station 22*b*, 22*c*, base site controller 22*e*, and at the central mobile switching centre 22*g*, is a combiner and multicasting unit 21*a*, b, c which has the capability, on receiving instructions from the processing unit 24 in the mobile switching centre 22*g*, to set up any bearer links that are required. Since these units 21*a*, 21*b*, 21*c* are integral parts of the base stations, their mode of operation, and the data handling formats involved, will vary from unit to unit. Instructions to them may be sent over the bearer network itself, or may be sent over dedicated links direct from the processing unit 24.

The multicasting units 21*a*, *b*, *c* each take one logical incoming channel and distribute the signal to one or more logical channels in real time. In order to perform multicasting the unit must have information about the incoming logical channel which is to be distributed and to which logical channels it should be distributed. The combiner unit performs the converse. It combines several logical channels onto one logical channel. This combination may take the form of selective combination, in which the signals from the incoming logical channels are compared and the transmitted result depends on the respective qualities of the signals.

The multicasting/combining functional units do not need to be located at the same point as the multicasting and combiner application process unit 24, which can control multicasting and combiner units 21*a*,*b*,*c* throughout a large part of the network. If no one routing has sufficient capacity for the required service, different parts of the traffic (e.g. alternate timeslots) can be sent over different routes and combined at the destination.

The operation of the system of FIG. 7 will now be further described with reference to FIG. 6 which illustrates the system in functional terms. In particular, combining and multicasting functionality $B^{11}$ corresponds to combiner/multicast units 21*a*–*c*, and processor function $A^{11}1$ corresponds to process controller 24. The processing function $A^{11}$ itself is in three parts. Communicating with the combiner and multicasting functionality $B^{11}$ is an instruct-and-receive module 25. This receives data from each multicasting functionality (21*a*, *b*, *c*) and translates all such received data into a single processing data format that can be handled by a processing module 26. Conversely instructions from the processing module 26 are handled by the instruct-and-receive module 25 and converted into formats which can be handled by the individual combiner and multicasting units 21*a*,*b*,*c*.

The instruct and receive module 25 is a function operating in accordance with the combiner and multicasting function $B^{11}$ with which it communicates. A separate element of the unit 25 handles the format specific to each multicasting function 21*a*,*b*,*c*. These elements may be time slots in the operating sequence or data streams carrying addresses associated with the individual units. The signals sent from he combiner and multicasting unit $B^{11}$ to the processing unit $A^{11}$ include confirmation that instructions sent to the units $B^{11}$ have been successfully carried out, or error messages to indicate that the instruction has failed for some reason. Such a message might be that the unit 21*a*,*b*,*c* corresponding with the function $B^{11}$ has all its connections in use and no further connections can be made. An associated application $C^{11}$ sends instructions to the process control unit $A^{11}$ requiring the addition of a new path, or the release of a path which is no longer required, for example because the call has terminated or because a handover has taken place. Process control unit $A^{11}$ performs this operation through the appropriate combiner/multicaster units $B^{11}$, and returns a response to application $C^{11}$ indicating that the requests have been performed successfully. Error messages are transmitted if this is not the case.

The commands and responses sent between the application $C^{11}$ and the external interface module 28 are the same regardless of which bearer link (and thus which combiner multicasting units $B^{11}$) is concerned. The processing unit $A^{11}$ handles any conversions of data format required. This means that the application $C^{11}$ can send signals to the process controller $A^{11}$ which are identical in all respects except for the identity of the bearer link to be set up or deleted. It is to be noted that to set up a bearer link it is necessary to use functionality at the nodes at each end of that link. Therefore the processing unit $A^{11}$ will normally respond to any instruction from the application platform $C^{11}$ by sending instructions to two combining and multicasting functions $B^{11}$ corresponding to the nodes 21*a*, 21*b*, 21*c* required. The selection of these functions can be carried out in the processing unit $A^{11}$ or by the application $C^{11}$.

The functions of processing unit $A^{11}$ may include the determination of appropriate timing delays in order that the signals arriving by different routes are properly synchronised. Since the bearer links may be of different length, and particularly if the links involve passing through different numbers of nodes on each of the two routes, each of which may involve coding delays, then it is unlikely that the two signals would arrive in synchronisation unless special arrangements are made to achieve this.

The application $C^{11}$ may require changes to the links arranged in combiner/multicasting units $B^{11}$ in response to changes in demand to the system, in order to maximise the utilisation of the capacity of the network.

In a mobile radio system, the number of bearer links required to support a mobile unit may vary as the signal quality changes in response to movement of the mobile unit. The mobility application function $C^{11}$ consequently instructs process control unit $A^{11}$ to change the number of bearer paths, usually in response to a detection of a decline in quality of the existing interface link. The mobility application platform $C^{11}$ may therefore instruct the process control unit $A^{11}$ to add a second bearer link taking an alternative route in order to improve the reliability of the link should the quality of the signal over the first link drop below a certain level. However, the opportunities for multicasting and combining paths are obviously greater when there is a small amount of traffic on the system. Therefore, if the traffic level increases it may be necessary for the mobility multicasting function $C^{11}$ to reduce the number of paths used by a particular call in order to allow the increased traffic to use the system. This means that for the existing call there may be a drop in the quality of the link, but this is necessary in order to handle all the traffic required at peak times. Conversely, if the amount of traffic falls then more bearer links become free and can be re-allocated to increase diversity for the remaining calls.

Multicasting and combining, although the functions are complementary, may exist as separate functions in one or more units not necessarily even at the same location. For a call in which data is travelling in both directions it is obviously necessary to have common network terminations, but it is possible for the two directions of data flow to pass over quite different combinations of bearers, so that the upstream and downstream paths or plurality of paths are not coincident e.g. in FIG. 5 up via nodes 22*a*, 22*b*, 22*e*, 22*g*; and down via nodes 22*g*, 22*f*, 22*d*, 22*a*. However, in a more typical case, a multicasting unit in the upstream direction corresponds topologically with a combining unit in a downstream direction and vice versa.

Figure 8:
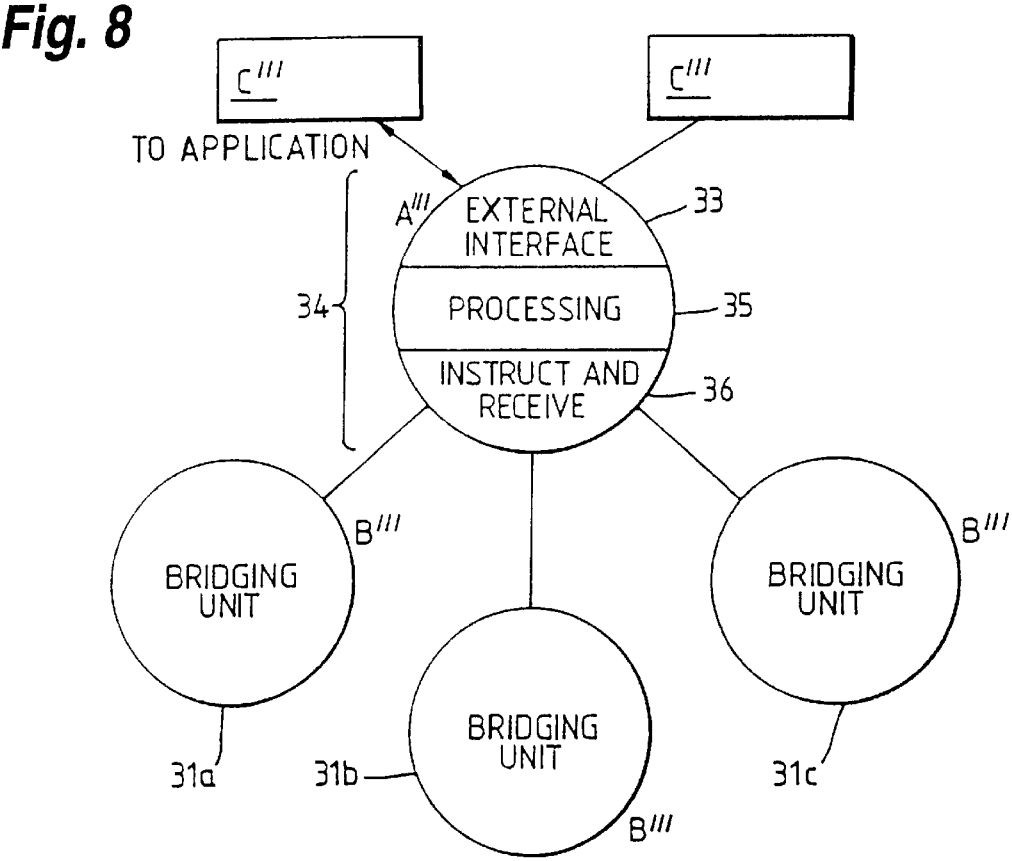
FIG. 8 shows in functional terms a system according to a fourth embodiment of the invention.
Figure 9:
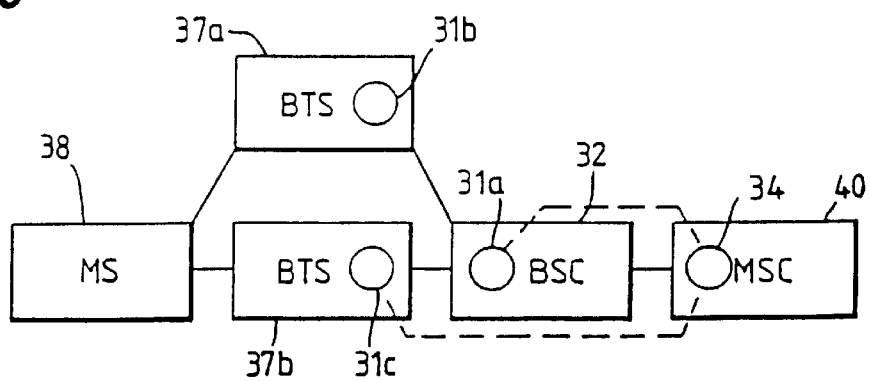
FIG. 9 shows schematically a mobile radio network in accordance with the embodiment of FIG. 8.
Figure 10:
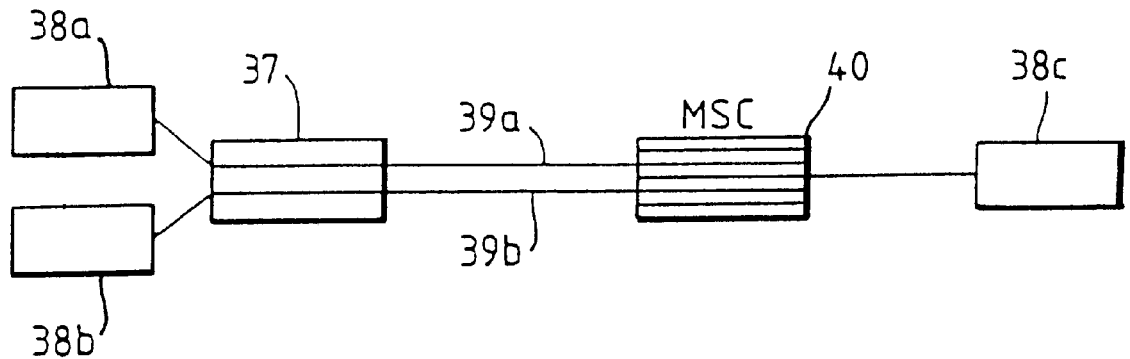
FIG. 10 shows a prior art cellular radio network having bridging capability only in the main switching centre.
Figure 11:
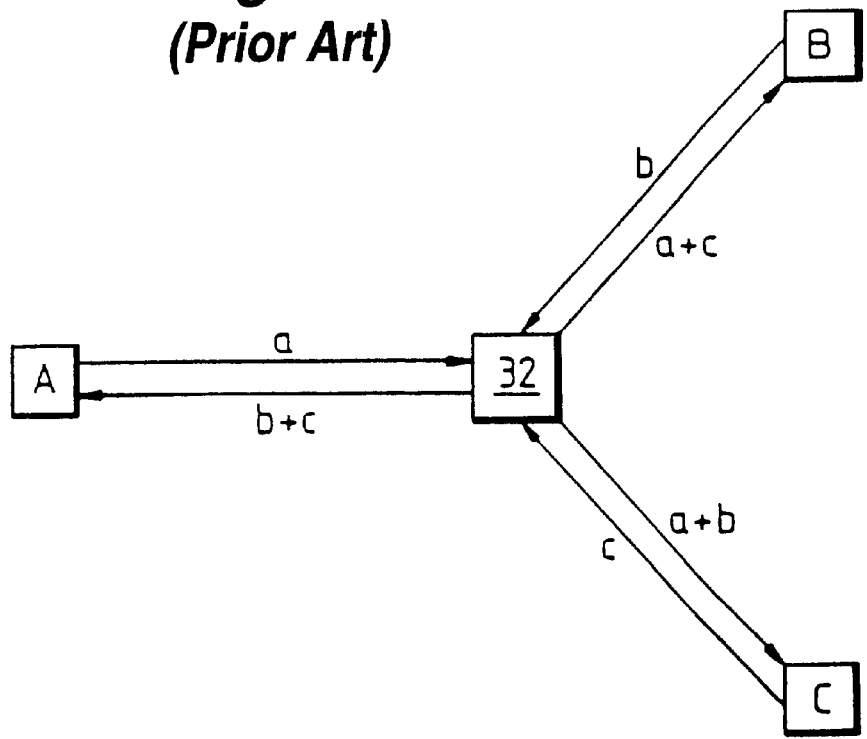
FIG. 11 shows schematically the topology of connections required in a prior art three-way conference bridge, as described with reference to FIG. 10.

A fourth embodiment, shown in FIGS. 8 and 9, provides a communication system with a bridging function. FIG. 9 shows the arrangement the physical realisation of this embodiment in a mobile radio network. In selected switching nodes 32*a* of the network, and also in base stations 37*a*, 37*b*, there are bridging units 31*a,b,c* which allow links to be set up between bearers. According to the embodiment, by arranging for the intelligence and the function it controls to be physically separate, bridging can be provided at points in the network where there is no control intelligence.

According to this embodiment, by arranging for the intelligence and the function controlled by the intelligence to by physically separate, bridging can be provided at points in the network where there is no control intelligence.

FIG. 8 shows the functional relationships between the various elements of the embodiment.

In this figure, two applications $C^{111}$ make use of the bridging functions. These applications both send instructions to set up bridging links to processor unit $A^{111}$ which processes the instructions and passes them to the appropriate bridging functions $B^{111}$. The processor unit $A^{111}$ comprises three modules, an external interface 33 for handling incoming signals from applications $C^{111}$, and if necessary converting them to a common format, a processing module 35 for allocating the signals to the appropriate bridging units, and an instruct and receive module 36 for formatting and transmitting the processed signals to the bridging unit.

An application $C^{111}$ which requires the use of the bridging control function can communicate with the external interface module 33 of the processing unit $A^{111}$. Such applications may include handover or conference bridging. These two applications are quite different in the way that they operate.

Handover happens automatically as a result of changes in signal quality measured between a mobile unit and the base stations nearest to it. As the quality declines from one base station and increases at the next base station a decision is taken by the handover application platform that the mobile units communication should be handed over from the first base station to the second. In preparation for this a "bridge" is set up between the existing base station-to-network link and the new base station-to-network link. Therefore when the decision to handover is made there is then no delay in establishing the new link. In this embodiment handover is treated as a discrete event. This is a simple case and assumes that diversity, as described in the previous embodiment is not also being used. However, the diversity of the previous embodiment could be combined with this bridging embodiment to provide a "soft handover" where signals are received from more than one base station at a time but different weightings are given to the signals depending on the quality of each signal.

The functions $B^{111}$ must be capable of operation as part of different network elements, and therefore have different formats for their operating instructions. Signals are sent to the individual functional units $B^{111}$ giving instructions to them as to the connections to be made. The bridging function $B^{111}$ send information back to the processing unit $A^{111}$ to confirm that the instructions have been performed or have failed. These signals are converted into a standard format within the instruct and receive module 36 of the processing unit $A^{111}$. The external interface module 33 of the processing unit $A^{111}$ may communicate with more than one application $C^{111}$ for example with a handover application and a conference bridging application. These may themselves each have their own data formats. Data in these formats is converted by the interface module 33 into a common format for processing. The processing module 35 within the processing unit 34 converts the instructions from one of the applications $C^{111}$ to set up bridges into instructions to be sent to the bridging function $B^{111}$. This process includes the selection of which of the physical units 31a,b,c are to be used to set up the individual bridge. Processing unit $A^{111}$ also sends instructions specifying the bandwidth required in the bridge, and receives information back from the bridging function $B^{111}$ if for any reason a bridge cannot be set up as required.

FIG. 9 shows a mobile radio network having a bridging process control unit 34 located in a mobile switching centre 40 and bridging units 31a, 31b, 31c, which may be at any point at a lower functional level in the network e.g. base site control units 32 or base stations 37. For handovers. the use of a bridging unit 31a in the base site control unit 32 allow a mobile to be connected to two base stations 37a, 37b simultaneously, facilitating handover. This ensures that no data is lost during the handover. Once the bridge is established in the base site controller 32 and it is confirmed both that the bridge is in place and data is being received from the mobile unit through the new base station 37b, the first base'station 37a can be released. Were such a bridging function not available, the first base station 37a would have to be released before it is certain that the new base station 37b is effectively linked to the mobile unit.

A difference between the simple conference bridging function and multicasting is that in multicasting all paths eventually reach the same destination and the signal is combined, whilst in conference bridging the paths all end at different places and the signals are carried in their entirety to each location. However, the two functions may be combined with each bridged path itself being split and combined. Moreover, both multicasting and bridging may be used in providing "soft handover". For the bridging functionality the mobile unit, as seen from different base stations during handover, is considered to be two separate terminations, but in terms of the multicasting functionality it is a combining and multicasting node.

In all of the described embodiments the basic functions, e.g. controlling switching measurement and other functions required of the network are built in at the place where the function is required. The operating parameters of these functions are compatible with the equipment at that location, but are for this reason different from the parameters of other functions. That is to say, because the equipment controlled at different locations in the network is itself different, the control functions are different. Similarly, the applications e.g. services or service elements which control such operations as handover, bridging, macro diversity, etc. are not necessarily fully compatible with each other or with the basic network functions. They may also be located at different places in the network. Process control functions provide the necessary interface in order to allow the basic network functions to be as simple as possible, (decision making being transferred elsewhere in the network). The processing control unit includes an interface module in order to convert the formats of the signalling data received from the basic network functions into a common format which can be handled by the processing module itself. The processing module interprets the instructions from the application and determines what instructions need to be sent to the basic network functions.

Figure 17:
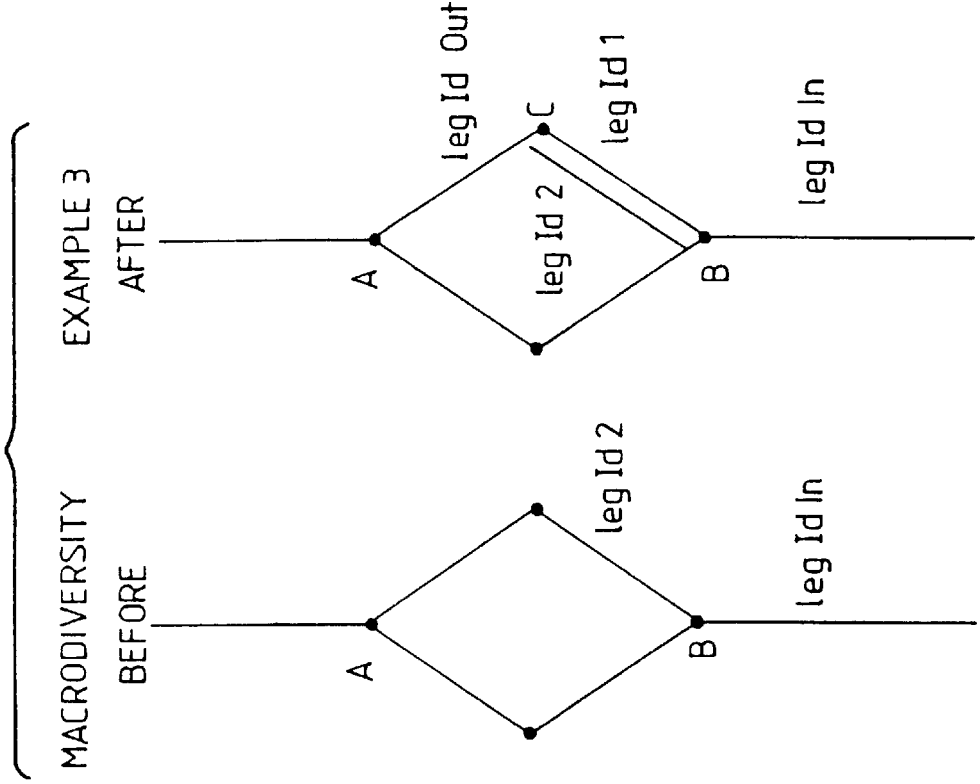
Figure 16:
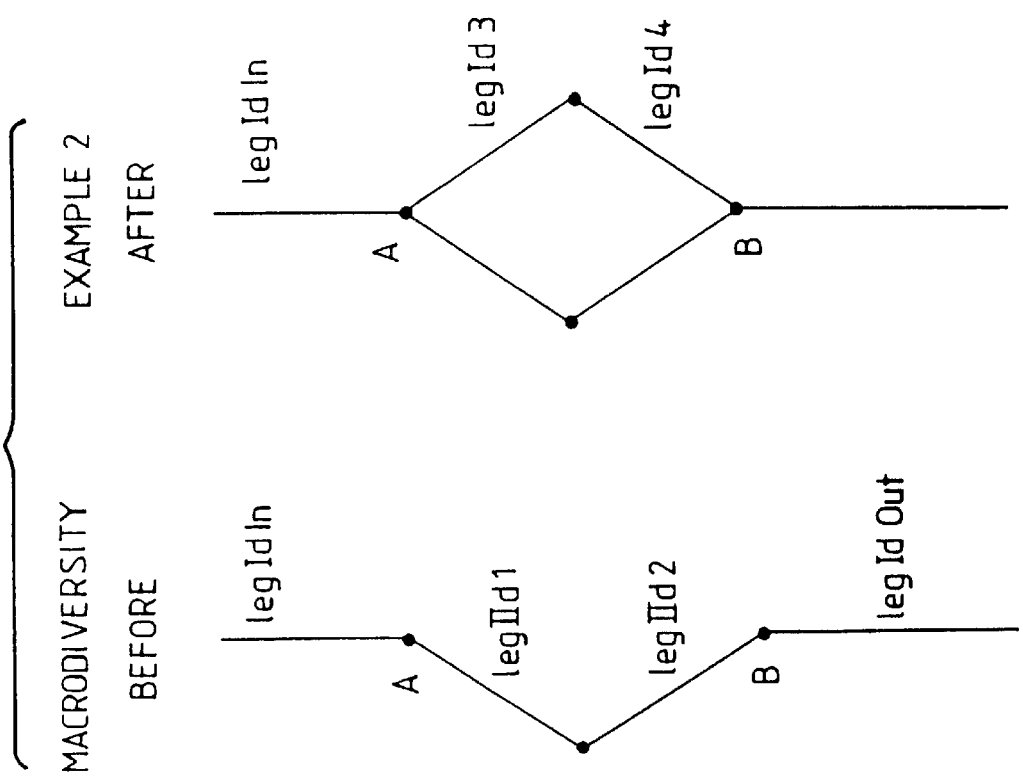

The operation of the invention will now be described with reference to FIGS. 15 to 20. FIGS. 15, 16 and 17 illustrate three possible changeovers which can be effected in a simple diversity control system.

Figure 6:
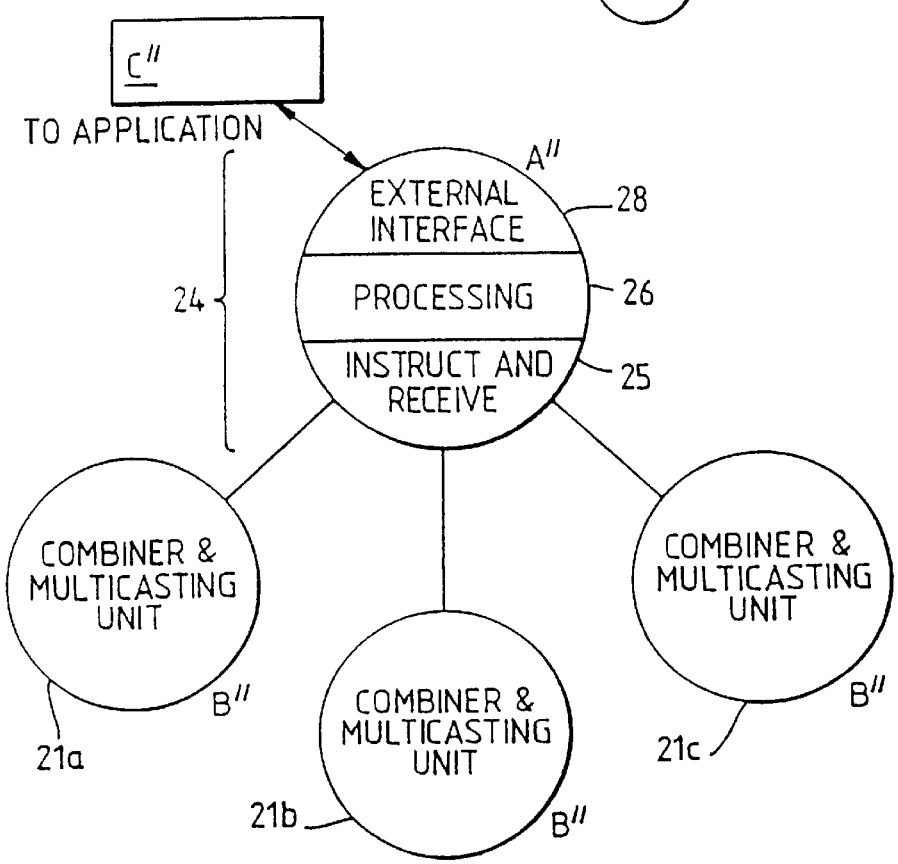
FIG. 6 shows the network of FIG. 5 in functional terms.
Figure 18:
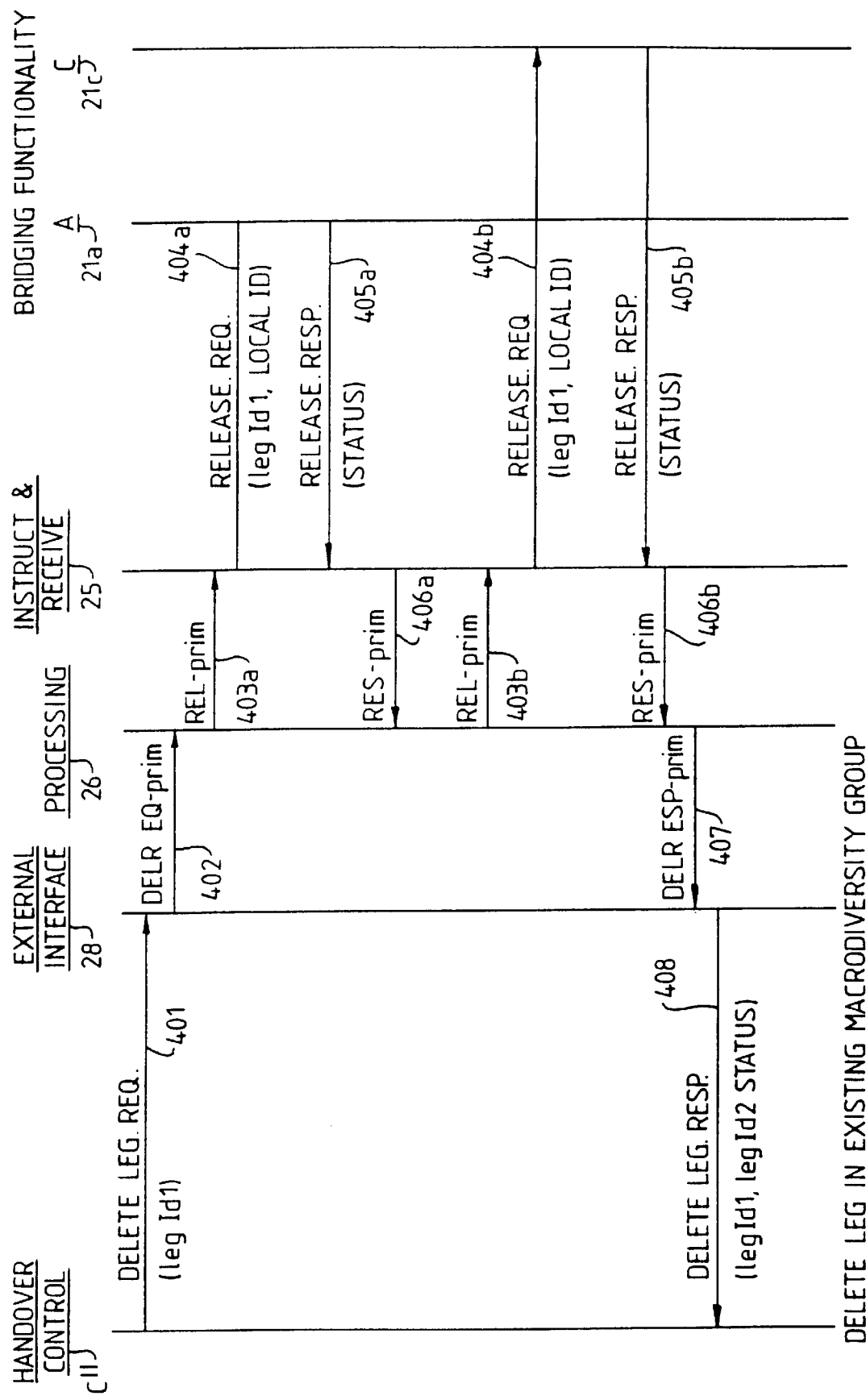
FIGS. 18, 19 and 20 are flow charts illustrating the data flows taking place within the embodiment of FIGS. 6 and 7 to control the system of FIGS. 15, 16 and 17.
Figure 19:
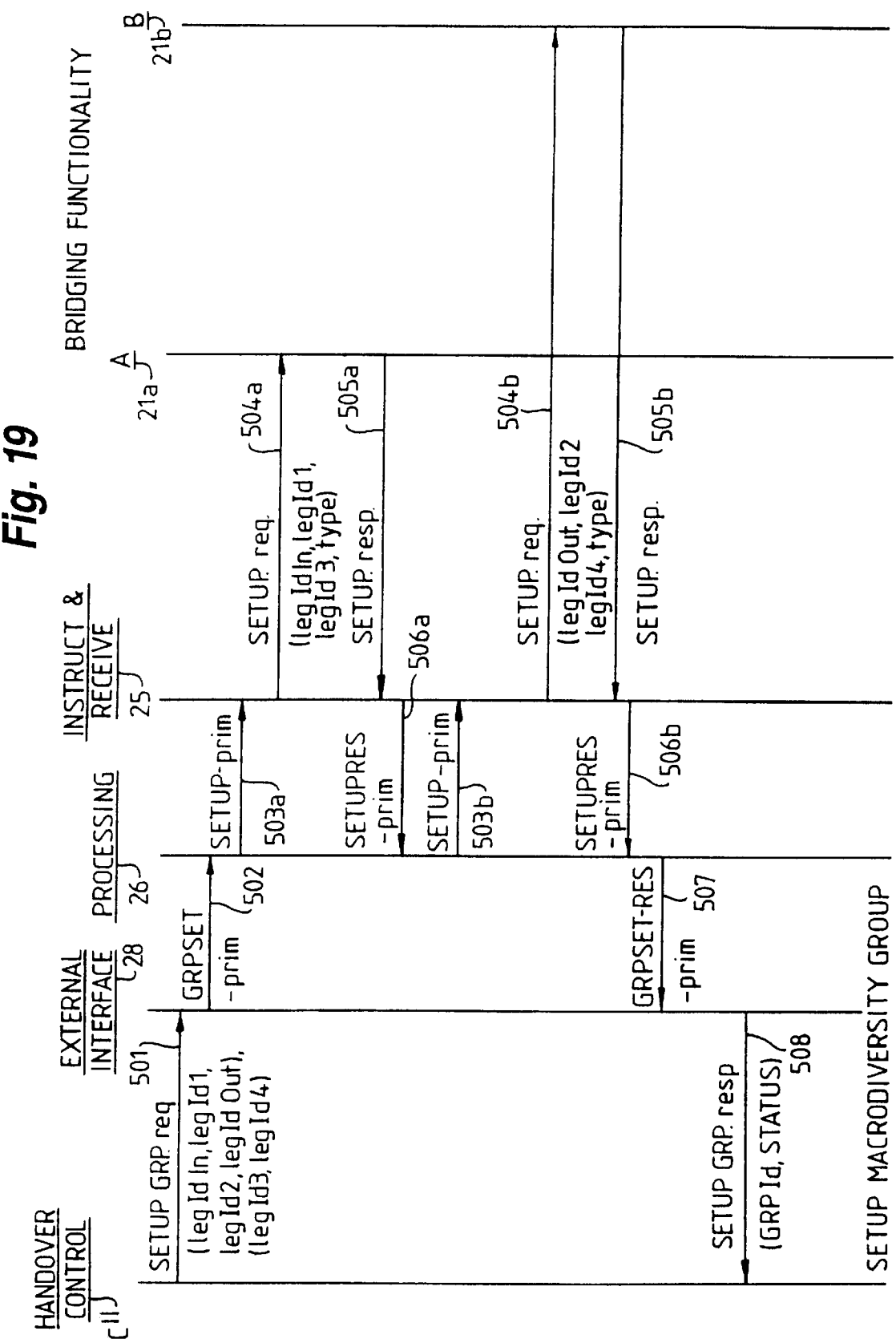
Figure 20:
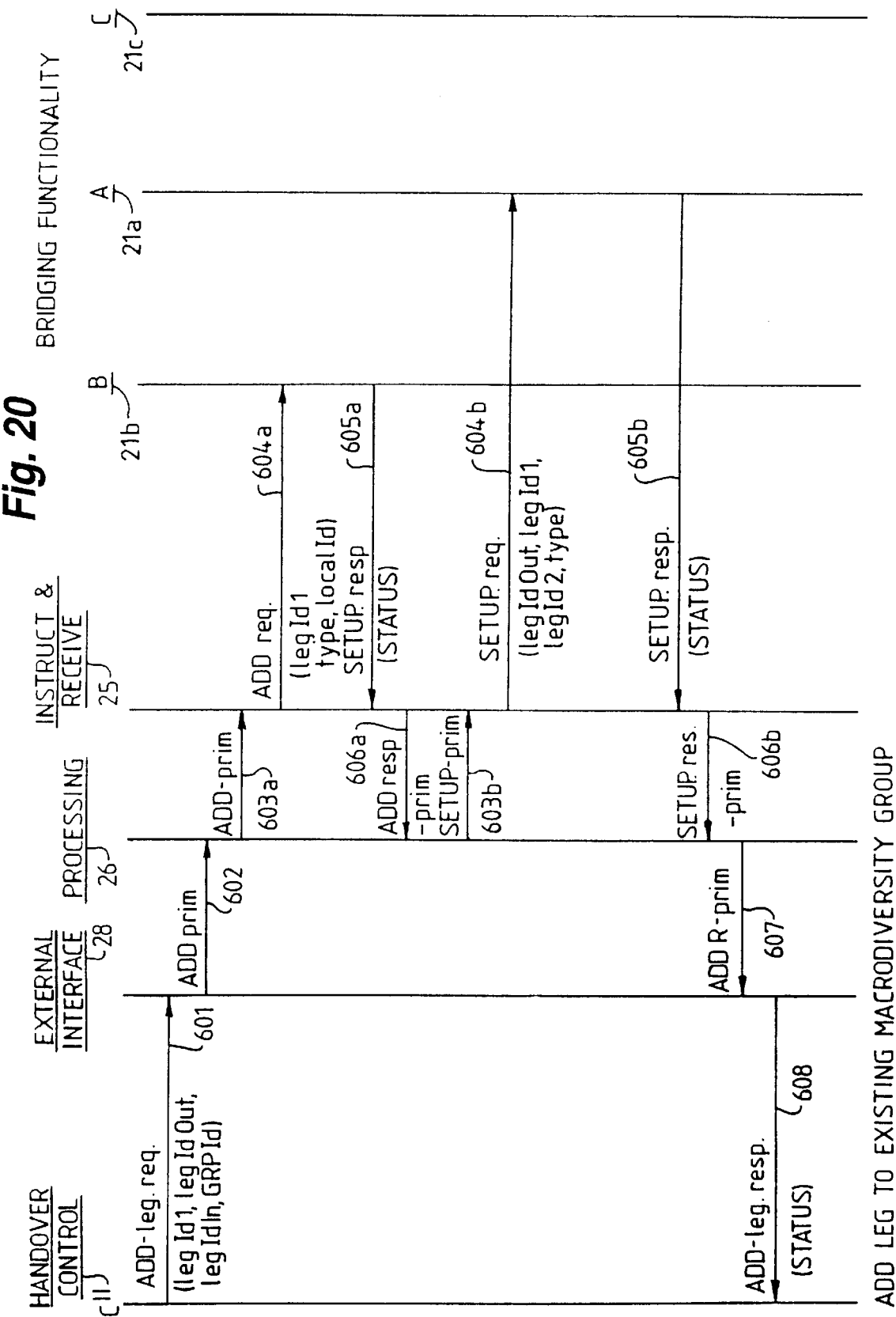

FIGS. 18, 19 and 20 are flow charts illustrating the data flows taking place within the system of FIGS. 6 and 7 in order to control the system of FIGS. 15, 16, and 17. in this system bridging functionality is used to provide the extra connections required for the multicasting and combining functions.

In each of FIGS. 15, 16 and 17 the left hand part shows the initial state and the right hand part the final, desired, state.

In FIG. 15 a connection between points A and B (leg ld1, leg ld2) is to be released, leaving a single connection (leg ld3, leg ld4) between those points. Conversely in FIG. 16 a second connection leg ld3, leg ld4 is to be added to an existing connection (leg lld1, leg lld2).

In FIG. 17 a second connection leg ld1 is added in parallel to an existing bearer link leg ld2 between the same two nodes B, C thus adding a link to an existing group.

Six message formats are available to external application $C^{11}$.

These messages set up "bridges" between bearer links in order to allow combining and multicasting to take place. Thus in this embodiment the combiner and multicasting units 21a, 21b, 21c have bridging functionality. A bridge is required if more than two nodes are interconnected: a simple point-to-point link between two nodes uses only one bearer link and needs no bridging functionality. The six message formats are:

1) "SetupGrP request".

This message instructs the processing module 26 to form a new bridging group. This message has parameters specifying the constituent legs that form the bridging group and specifies the incoming and outgoing legs. It also identifies the type of bridging to be performed (i.e. selective combining active path, etc.).

2) "SetupGrP response".

This message returns a Group ID (GRP Id) which identifies the bridging group and the status of the bridging group (i.e. active).

3) "Add-Leg request".

This message instructs the processing module 26 to control the addition of an additional leg to an existing bridging group. This message has parameters indicating the leg that should be added to the bridging group (Leg ID) and two legs to which the identified leg should be connected and the identity of the bridging group (GRP ID). (The processing module 26 calculates from its own knowledge and this information the legs that require bridging.)

4) "Add-Leg response".

This response is a Status parameter indicating whether the procedure is successful.

5) "DeleteLeg request".

This message instructs the processing module 26 to control the deletion of a leg, identified by the leg ID, from the bridging group, identified by the GRP ID. If the group consequently ceases to exist the group will be deleted.

6) "DeleteLeg response".

The response indicates whether the operation has been successful and whether the bridging group still exists.

FIG. 18 shows the operation of the embodiment of FIGS. 6 and 7 to delete a leg from a bridging group. As shown in FIG. 15, the control application requires the dropping of one of the two links between point A and B.

The control application $C^{11}$, in this case the handover control application, sends message 401 for the deletion of a leg or legs, Legid 1, from bridging group GRPID (21a, 21c). The processing unit 26 is informed about what procedure it has to perform, in this case the deletion of a leg from the bridging group, by primitive 402 from the external interface module 28. The processing module 26 then proceeds to delete the leg by contacting each of the remote bridging units 21a, 21c, in turn by messages 403a, 404a and 403b, 404b respectively and deleting relevant legs from the remote bridging units. If one active leg is deleted from a path, in the example LegId 1 then the algorithm in the processing module 26 will also delete any associated legs that have become unused, in the example Legid 2 (see FIG. 15). When the processing module 26 requires to delete a leg from the bridge controlled by the remote bridge functionality 21*a*, 21*c* it transmits to the instruct and receive module 25 a REL primitive, 403*a*, containing information about the LegId to be deleted and a local identifier uniquely identifying the bridge at the node. The instruct and receiver module then sends a Release request message 404*a*, in a format that will be recognised by the remote bridging functionality. In this case the format will be relatively simple in that the bridging functionality is assumed to simply delete a leg from a bridge and if the bridge then only has one leg coming in and one leg coming out (i.e. there is only one bearer link remaining so the bridge is no longer required) the bridge is deleted. The response message 405*a* indicates whether the bridging functionality is still active. On receipt of this message by the instruct and receive module 25, the module issues a RES primitive 406*a* carrying the status to the processing module 26. The processing module 26 then continues to delete any other legs from bridges controlled by other bridging functionality (In the example Combiner 21*c*) using messages 403*b*, 404*b*, 405*b*, 406*b*. When the processing functionality 26 has completed deleting legs from bridges it returns a delresp primitive 407 to the external interface module 28 indicating which legs have been deleted (LegID1, LegID2) and the overall status (Status parameter) of the bridging group. The external interface module issues a SetupGrP response 408 containing the parameters includes in the delresp primitive.

FIG. 19 shows the operation of the embodiment of FIGS. 6 and 7 to create a new bridging group. The control application, in this case the handover control application C11, asks for the setting up of a bridging group between points A and B (FIG. 16) consisting of the identified legs (LegIDIN, LegID1, LegID2, LegID3, LegID4, LEGIDOUT). This is transmitted in a request message 501.

The processing module 26 is informed about what procedure it has perform, in this case the creation of a bridging group from a collection of legs, by a primitive 502 from the external interface module 28. The processing module 26 then proceeds to create bridges, controlled by bridging functionality, 21*a*, 21*b*, 21*c* at nodes where the processing module 26 calculates bridging needs to created. When the processing module 26 requires to set up a bridge using the remote bridge functionality 21*a*, 21*b*, 21*c* from a group of legs it issues to the Instruct-and-Receive module 25 an ADD primitive 503 containing information about the LegIds required to form the remote bridge at a node, to the instruct and receive module 25. The instruct and receive module 25 then sends a Setup request message 504*a* in a format that will be recognised by the remote bridging functionality 21*a*. In this case the format will be again relatively simple in that the bridging functionality 21*b* is assumed to simply create a bridge. The format specifies the legs that are to form a bridge and the type of bridge required. The response message 505*a* indicates whether the bridging functionality 21*b* is active or the operation has failed. On receipt of this message by the processing module 26 carrying the status, the processing module 26 then continues to form any other bridges required. (In the example bridging functionality 21*b*). When the processing module 26 has completed creating bridges it returns a grpsetres primitive 507 continuing a GRPID, allowing simple identification of the bridging group, and the overall status (Status parameter) of the message 508 containing the parameters present in the grpsetres primitive 507.

FIG. 20 illustrates the addition of a leg to an existing bridging group using the embodiment of FIGS. 6 and 7. The control application, in this case the handover control application, sends a request 601 asking for the addition of one or more legs, LegID, to the existing bridging group GRPID. (See FIG. 17). The processing module 26 is informed about what procedure it has to perform, in the case the addition of a leg to an existing bridging group, by a primitive 602 from the external interface module. The processing module then proceeds to add the leg(s) by contacting each of the remote bridging units in turn and adding relevant legs to remote bridging units in forming new bridges. When the processing module 26 requires to add a leg to a bridge controlled by a remote bridge functionality 21*b*, it issues an add primitive 603*a* containing information about the LegId to be added and a local identifier uniquely identifying the bridge at the node, to the instruct and receive module 25. The instruct and receive module 25 then sends an Add request message 604*a* in a format that will be recognised by the remote bridging functionality 21*b*. In this case the format will be again relatively simple in that the bridging functionality 21*b* is assumed to simply add a leg to a bridge and hence requires only the legId and the local bridge reference. The response message 605*a* indicates the status of the bridge (i.e. active or not active). On receipt of this message by the instruct and receive module 25, the module issues an address primitive 606*a* to the processing module carrying the status. The processing module then continues to either add new legs to bridges controlled by other bridging functionality 21*b* or to setup a new bridge (In the example a SETUP request 604*b* is sent to bridging functionality 21*a*). (Messages 603*b*, 604*b*, 605*b*, 606*b*). When the processing functionality has completed adding legs to bridges or creating new bridges it returns a primitive 67 to the external interface module 28 indicating the overall status of the add operation. The external interface module issues a AddLeg response 608 containing the parameters included in the primitive 607.

The embodiments described above are referred to a cellular telecommunications network in which the traffic-bearing links also carrying the necessary control signalling to operate the present embodiment. The invention may be applied to any communications system in which control and monitoring functions are required at points distributed throughout the system. Dedicated signalling signalling links may be used if the system to which the invention is applied has no other suitable links available.

I claim:

1. A method of operating or controlling a communications system, said communications system comprising a network of functional elements and application process elements, each application process element controlling a plurality of the functional elements, the method comprising:

transmitting intranetwork commands by the application process elements to an interface element connected to said network, the commands transmitted by the application process elements being independent of the type or configuration of the functional elements; and processing the commands to convert said commands to commands suitable for controlling the functional elements.

2. A method according to claim 1 wherein two or more of the functional elements and application process elements use data in different formats and the processing step includes conversion of data generated by one of the elements into a format appropriate for the element or elements for which the data is intended.

3. A method according to claim 1 wherein at least two of the functional elements and application process elements use different operating protocols, and the processing step includes translation of incoming data into a protocol suitable for the element or elements for which the data is intended.

4. A method according to claim 1 wherein the processing step includes addressing signalling packets to individual functional elements.

5. A method according to claim 1 wherein the processing step includes the selection of the functional elements and/or application process elements to which the data flow is to be transmitted.

6. A method according to claim 1 wherein the application process element controls a high level service function and the processing step includes the operation of functions in support of the high level service function.

7. A method according to claim 6 wherein the processing step includes the setting up of a handover of a user terminal from one network termination to another.

8. A method according to claim 6 wherein the processing step includes the setting up of multicast functions by suitable functional units.

9. A method according to claim 6, wherein the processing step includes controlling a functional element to combine a plurality of data streams arriving at a node into one outgoing data stream.

10. A method according to claim 9 wherein the processing step includes controlling the synchronisation of the incoming data streams.

11. A method according to claim 6 which the functional elements include a capability to form bridges between bearer links, wherein the processing step includes the creation and release of such bearer bridges.

12. A method according to claim 11 wherein the processing step includes arranging a bridging connection as part of a handover operation of a user terminal from one network termination to another.

13. A method according to claim 1 wherein the processing step includes the processing of measurement data.

14. A method according to claim 13 wherein the processing step includes mathematical operations performed on the data from one or more functional elements.

15. A method according to claim 14 wherein the processing step includes the calculation of a time average of data received from a network operating function.

16. A method according to either claim 14 wherein the processing step comprises collecting measurement data from more than one functional element and performing a comparison between such data.

17. A method according to claim 16 wherein the measurement data is a measure of a quality of a signal.

18. A method according to claim 16 wherein the processing step includes the identification of the functional element from which the measurement value is closest to a predetermined or optimum value.

19. A method according to claim 13, wherein the processing step uses the measurement data to control handover of a user terminal from one network termination to another.

20. A method according to claim 1 wherein the communications system includes one or more mobile units.

21. A method according to claim 20 wherein the communications system is a cellular radio system.

22. A method according to any preceding claim 1 wherein the communications system includes fixed termination points.

23. A communications system comprising a network of a plurality of functional elements and one or more application elements for controlling, or being controlled by, the functional elements, said communications system comprising:

an intermediate processor element interfacing one application process element and a plurality of functional elements of the network, the application process element being configured to generate commands in a form which is not specific to the configuration types of functional elements; and the intermediate processor element being configured to carry out the commands generated by the application process element by transmitting translated commands to the functional elements.

24. A communications system according to claim 23 in which two or more of the functional elements and application process elements have different data protocols, and wherein the intermediate processor element has means for converting data signals into the protocol or protocols appropriate to the intended destination element or elements.

25. A communications system according to claim 23 in which the intermediate processor element has means for determining in response to a given command from a application element which of a plurality functional elements are to be operated.

26. A communications system according to claim 23 in which the intermediate processor element has a respective interface sub-element for each of one or more functional or application process elements, and the interface sub-elements have means for adapting data into a format suitable for the respective element.

27. A communications system according to claim 23 in which a common interface sub-element of the intermediate processor comprises means for sending and receiving signals to and from each of a plurality of functional or application process elements.

28. A communications system according to claim 26 wherein the respective common interface sub-elements for sending data to each functional and/or application process element has means for providing a data signal having an address code for the intended functional or application process element.

29. A communications system according to claim 23 having a plurality of application process elements.

30. A communications system according to claim 23, having dedicated signalling links for transmitting signals between the intermediate processor and the functional elements and the application process elements.

31. A communications system according to claim 23 wherein the system is a telecommunications system.

32. A communications system according to claim 31 wherein the system is a cellular radio network.

33. A communications system according to claim 31 wherein at least some signalling links for transmitting signals between the processor function element and the functional elements and/or the application elements are provided by telecommunications links of the network.

34. A communications system according to claim 23 wherein the functional elements include means for measuring operating characteristics of the system.

35. A communications system according to claim 23 wherein the functional elements comprise means for creating bridges between bearer links of the system.

36. A communications system according to claim 23 wherein the functional elements comprise means for multicasting and/or combining data flows carried by bearer links of the system.

37. A communications system according to claim 23 having an application process element for control of handover of a mobile terminal from one system termination to another.

38. A communications system according to any claim 23 having an application process element for controlling establishment of conference bridges.

39. A communications system according to any claim 23 having an application process element controlling diversity routing over communication paths of the system.

40. A communications system according to claim 23 wherein the system includes at least one mobile unit.

41. A communications system according to claim 40, wherein the communications system is a cellular network.

42. A communications system according to claim 23, wherein the communications system includes at least one fixed terminal.

43. An intermediate processing unit for a communications system for controlling a number of functional elements of a network of the system, said functional elements being controlled by one or more application process elements of the system, said intermediate processing unit comprising:

an external interface module for receiving intranetwork commands from an application process element in a form not specific to the configuration or type of the functional elements;

an instruct and receive module for executing the received commands and transmitting said received commands to the functional elements required to execute the command; and a processor module for processing data passing between the functional elements and the application process element.

44. An intermediate processing unit according to claim 43 in which the instruct and receive module converts signals between a processing format used by the processing module and individual operating formats used by the individual functional elements.

45. An intermediate processing unit according to claim 43 in which the instruct and receive module comprises means for selecting the functional elements to or from which signals are to be distributed and/or received.

46. An intermediate processing unit according to claim 45 further comprising means for communicating with each functional element sequentially.

47. An intermediate processing unit according to claim 45 in which the instruct and receive module comprises means for sending messages each with an associated address code corresponding to an individual functional element.

48. An intermediate processing unit according to claim 43 wherein the external interface module comprises means for converting signals the processing module into a format useable by an associated application process element.

* * * * *